United States Patent [19]

Poussier et al.

[11] Patent Number: 4,782,456

[45] Date of Patent: Nov. 1, 1988

[54] SYSTEM FOR DETECTING THE PRESENCE OF A PURE SIGNAL IN A DISCRETE NOISY SIGNAL MEASURED AT A CONSTANT AVERAGE NOISE LEVEL WITH A PROBABILITY OF FALSE DETECTION BELOW A PREDETERMINED FALSE DETECTION LEVEL

[75] Inventors: Emile Poussier, Is sur Tille; Michel Rambaut, Bures sur Yvette, both of France

[73] Assignee: Commissariat a l'Energie Atomique, Paris, France

[21] Appl. No.: 855,494

[22] Filed: Apr. 23, 1986

[30] Foreign Application Priority Data

Apr. 23, 1985 [FR] France .................................. 85 06164

[51] Int. Cl.4 ...................... H04B 15/00; G06F 15/20
[52] U.S. Cl. .................................... 364/574; 364/554
[58] Field of Search ................. 358/167; 364/571, 574, 364/554; 381/94

[56] References Cited

U.S. PATENT DOCUMENTS

| | | | |
|---|---|---|---|
| 3,506,813 | 4/1970 | Trimble | 364/574 |
| 3,557,354 | 1/1971 | Trimble | 364/574 |
| 4,367,490 | 1/1983 | Riederer | 358/167 |

OTHER PUBLICATIONS

Nucleonics, vol. 24, No. 8, Aug. 1966, pp. 118-121, New York, U.S.; W. L. Nicholson: "Statistics of Net--Counting-Rate . . . Background Corrections".

Health Physics, vol. 32, No. 1, Jan. 1977, pp. 1-14, Pergamon Press, Oxford, GB; J. J. Donn et al.: "The Statistical Interpretation of Counting Data from Measurements of Low-Level Radioactivity".

Nuclear Instruments & Methods, vol. 206, No. 3, Mar. 1983, pp. 501-506, North-Holland Publishing Co., Amsterdam, NL; T. J. Sumerling: "Calculating a Decision Level for Use in Radioactivity Counting Experiments".

Primary Examiner—Parshotam S. Lall
Assistant Examiner—Edward R. Cosimano

[57] ABSTRACT

A system for detecting the presence of a pure signal in a discrete noisy signal measured at a constant average noise level M, having a processor for measuring a counting rate N and for calculating a false detection probability PF as a function of the counting rate and an estimated average noise level M, and for comparing the probability with a predetermined false detection level TF. A pure signal is detectd when the probability is below the false detection level.

5 Claims, 3 Drawing Sheets

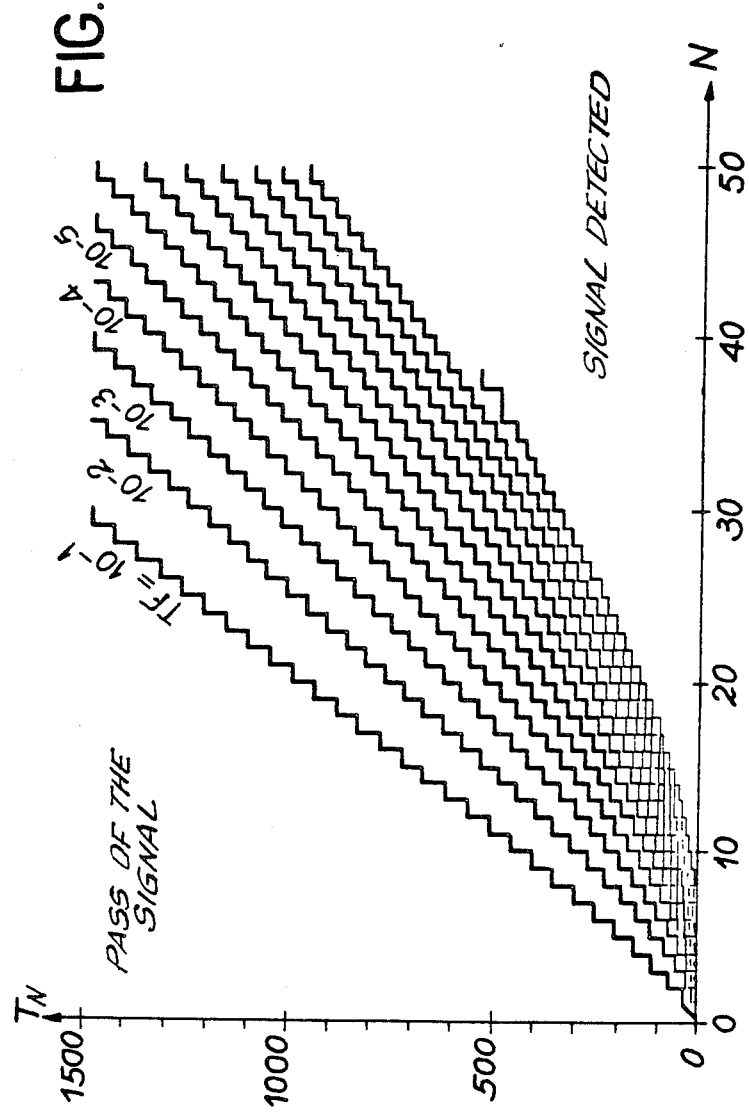

SYSTEM FOR DETECTING THE PRESENCE OF A PURE SIGNAL IN A DISCRETE NOISY SIGNAL MEASURED AT A CONSTANT AVERAGE NOISE LEVEL WITH A PROBABILITY OF FALSE DETECTION BELOW A PREDETERMINED FALSE DETECTION LEVEL

BACKGROUND OF THE INVENTION

The present invention relates to a system for detecting the presence of a pure signal in a measured discrete noisy signal, said detection being performed with a false detection probability below a predetermined false detection level. The invention relates to the detection of discrete signals, i.e. signals produced by discontinuous events. The invention particularly applies to the detection of corpuscular radiation, such as neutron or gamma rays.

The detection of a pure signal in a measured noisy signal assumes that it is possible to eliminate the noise in said measured signal. The invention relates to a detection process when the average or mean noise level is constant. This condition is substantially always realized for neutron radiation, because there are very few free neutrons in nature. It is also often realized at a given location for a certain period of time in the case of gamma radiation.

The detection of a particular corpuscular radiation, e.g. of the nuclear type, takes place in the presence of corpuscular noise having several causes. In the case of nuclear radiation, part of the noise is due to cosmic radiation and the other part is due to the natural radioactivity of the ground and rocks. Noise due to the detector used also exists. Cosmic radiation can vary over a period of time and the corpuscular noise due to the rocks and ground is essentially variable, as a function of the place where the measurement is performed. A particular radiation can consequently only be detected on knowing the noise or on having an adequate estimate thereof.

Information is stored for a limited time $\Delta T$. This information storage takes place in a discrete manner, when a particle is detected, the content of a memory is increased by one unit. In general, one or more parameters define the detected nuclear event. In the case where this event is only dependent on a single parameter, the latter can e.g. be the energy and this is the typical case of detecting a gamma radiation with the aid of an intrinsic germanium or a NaI scintillator associated with a photomultiplier. This single parameter can also be time, e.g. when measuring the transit time of a particle. The detection condition can also be a complex logic function dependent on the state of several detectors during a very short time interval, generally a few dozen nanoseconds, e.g. in the case of the detection of particles in a bubble chamber.

Normally, to know whether a signal has been detected with the aid of a storage performed during a time interval $\Delta T$, existing practice consists of evaluating by what value the count obtained exceeds the available noise estimate. This noise can be estimated in different ways. It can be known beforehand by a previously performed measurement in circumstances where certainty exists that there is no particular signal. It can also be evaluated during experiments by extrapolating or interpolating the detected signal levels in different intervals, e.g. of an energy type. For this purpose, there has to be an adequate counting rate in the intervals where certainty exists that there is no noise, in order to be able to make an estimate of the noise probability density in the intervals where it is wished to detect a particular radiation.

In a conventional manner, it is considered that there is a signal when the counting rate N is such that $N > B + K\sqrt{B}$, in which B is the estimated average noise level and K is a constant equal to a few units.

This known detection criterion is not satisfactory because it is of an empirical nature, the value of K being chosen in a non-determinist manner on the basis of previous experiments.

SUMMARY OF THE INVENTION

An object of the invention is to provide a detection system based on a rational criterion, deduced from the laws of the probability of the appearance of noise and the expected radiation. The detection according to the invention consequently has the advantage of being solely dependent on an objective criterion.

In the prior art a counting rate is only taken into consideration if it is above the average noise level increased by a certain number of times the standard deviation $\sqrt{B}$. According to the invention, it is considered that any exceeding of the average noise level constitutes an information on the presence or absence of a pure signal. This information is small when the difference between the counting rate and the average noise level is small.

The greater the difference between the counting rate and the average noise level, the more important the information supplied by the measurement and the smaller the false detection probability. The practical detection criterion of a pure signal is consequently the obtaining of an adequate information, i.e. above a threshold Im, namely a false detection probability below a predetermined false detection rate.

The detection according to the invention consequently comprises comparing the false detection probability PF, defined by the measured counting rate N and an estimate of the constant average noise level M with a predetermined false detection rate or level TF. A pure signal is detected if said probability is below said level.

On knowing the probability density of the number of events detected during each time interval, which is generally the case, the false detection probability can be expressed as a function of the counting rate N and the estimated average noise level M. This probability density is e.g. that of Poisson's law for corpuscular radiation.

The direct use of the relation between the false detection probability PF, the counting rate N and the average noise level M to decide whether a particular radiation is detected can lead to long and complicated calculations, because the false detection probability PF is generally a complex function of the counting rate N and the average noise level M. The duration of the calculation can in particular depend on the value of the counting rate N and can be incompatible with a real time detection, if the duration of each count is approximately one second for example.

To obviate this and permit a real time detection, it is proposed to use, for each value of the predetermined false detection level TF, a table containing for a plurality of count rate values, the value of the associated average noise level, so that the false detection probability PF for this average noise level and said count rate is equal to the predetermined false detection level TF.

According to a preferred feature, the measured count rate N is used as the table entrance index.

The average noise level $M_N$ contained in the table at N is compared with the estimated constant average noise level M, whereby the latter can be calculated in different ways. It can in particular be taken as equal to the mean value of a plurality of counting rates preceding the final measured counting rate. The comparison between these noise levels is equivalent to the comparison between the false detection probability and the predetermined false detection level.

In general terms, the mean noise level contained in the table is not an integer. It can then be advantageous to replace the comparison between the average noise level $M_N$ given by the table and the estimated constant average noise level M by a comparison between integral values which are functions of these average noise levels.

For example, if the estimated constant average noise level M is obtained by forming the mean of k successive counting rates, it may be preferable to tabulate the closest integer $T_N$ to $kM_N$. The detection criterion is then solely based on the comparison between two integers: $T_N$ corresponding to the counting rate N and $T = kM = N_1 + N_2 + \ldots + N_k$, in which M is the estimated average noise level and $N_1$, $N_2$, etc. are k counting levels preceding the final count.

BRIEF DESCRIPTION OF THE DRAWINGS

The invention is described in greater detail hereinafter relative to non-limitative embodiments and the attached drawings, wherein show:

FIG. 4 is a graph indicating, for different values of the predetermined false detection rate TF, the presence or absence of a pure signal in the measured noisy signal as a function of the count rate N of the final measurement and the sum $T_N$ of the count rates of 64 measurements preceding the final measurement, said sum T being a function of the known average noise level.

DETAILED DESCRIPTION OF THE PREFERRED EMBODIMENTS

The invention is applicable to all discrete radiation, such as corpuscular radiation and more specifically relates to the analysis of the signal supplied by a detector for deciding, with a false detection probability below a predetermined false detection rate, whether the analyzed signal contains a pure signal due to the presence of a particular source, or whether the said signal solely comprises noise. For example, the process according to the invention is more particularly applicable to the detection of gamma and neutron rays.

Figure 1:
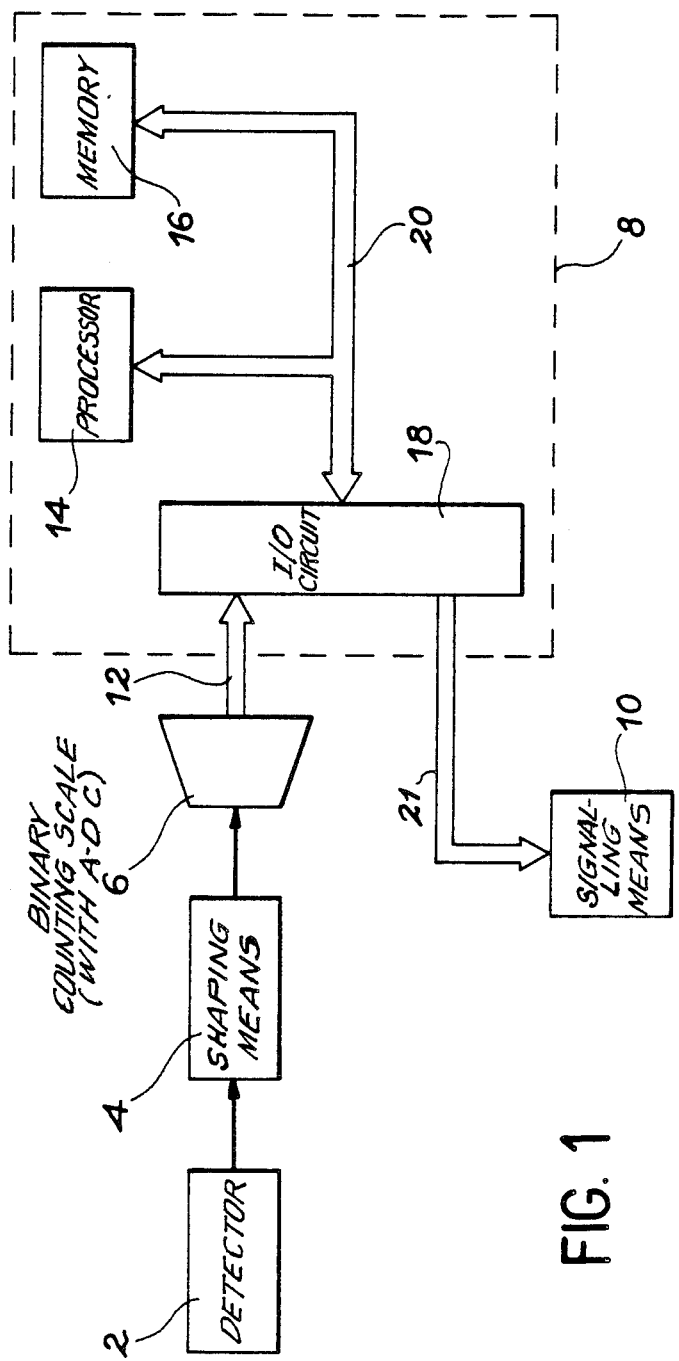
FIG. 1 diagrammatically the system according to the invention.

The apparatus shown in FIG. 1 comprises a detector 2, a shaping means 4, a binary counting scale 6, which can in particular comprise an analog-digital converter, a processing means 8 and a signalling means 10.

Detector 2 is dependent on the radiation to be detected. For the detection of gamma rays, said detector can be an intrinsic germanium or a NaI scintillator associated with a photomultiplier and for the detection of neutrons, the detector is e.g. a He3 counter.

Detector 2 supplies a voltage pulse for each detected event. This pulse is received by the shaping means 4. The latter can particularly comprise in series an amplifier, a shaping circuit and a discriminator. The binary counting scale 6 is positioned downstream of the shaping means 4 and counts the number of pulses supplied by means 4 for a counting time $\Delta T$.

Processing means 8 comprises a processor 14, at least one memory 16 and an input-output circuit 18. These components are connected by a channel 20 incorporating address lines, data lines and control lines. The counting scale 6 is connected to input-output circuit 8 by a bus 12.

Signalling means 10 is controlled by pressure 14 across input-output circuit 18 and a channel 21. It can in particular comprise visual and sound alert or alarm means, which are triggered when a pure signal is detected.

A description will now be given of the operation of the detection system according to the invention whilst considering, for example, the case of detecting corpuscular radiation, such as gamma or neutron radiation. The number of particles detected during a measurement period $\Delta T$ is a random value, whose probability density is that of Poisson's law. The detection probability P that during time $\Delta T$, there are I events due to particular radiations and J events due to the noise is:

$$P = e^{-(M_1+M)} \frac{M_1^I}{I!} \frac{M^J}{J!}$$

in which $M_1$ and M are mean levels associated with random variables representing the number of particles detected due to the particular radiation and the number of particles detected due to the noise.

Thus, the probability that, for N detected events, there is at least one event due to the radiation of level $M_1$ is:

$$P_1 = \sum_{I=1}^{N} P$$

and the probability that in the N detected events there is no event due to the radiation is:

$$P_2 = e^{-(M_1+M)} \frac{M^N}{N!}$$

The probability that there is a particular radiation, no matter whether storage N does or does not contain an event due thereto is then equal to:

$$\int_0^\infty (P_1 + P_2) dM_1 \text{ i.e. } e^{-M} \sum_{J=0}^{N} \frac{M^J}{J!}$$

The complementary probability is the false detection probability PF defining the probability of a particular radiation being detected when no particular radiation exists.

The detection system according to the invention comprises means for measuring this false detection probability PF, as a function of the measured counting rate N and the estimated background noise M and for comparing this probability with a predetermined false detection level TF.

This false detection level must represent an acceptable compromise between the false detection level which can be accepted by an operator and the distance of the radiation source from which it is wished to be able to detect said source. For example, a false detection rate TF of $10^{-3}$ roughly represents one false alarm every 15 minutes in the case where each measurement lasts one second. This value permits an operator walking at 1 meter per second to detect an activity of 2 micro-curies at 1.20 m.

The first stage of the detection according to the invention consists of producing the table defining the pairs (N, $M_N$) corresponding to a predetermined false detection level TF. This table is constituted by a group of storage cells. The cell of subscript I, in which I is an integer, contains a number $M_I$ such that the false detection probability for a counting rate I and a noise $M_I$ is equal to the predetermined false detection rate TF.

The second stage of the detection according to the invention consists, for each measured counting rate N, in estimating the average noise level M and comparing said level with the content of the cell of subscript N in the table. It is decided that a signal corresponding to a particular radiation has been detected if the estimated average noise level is below the average noise level given by the table.

Figure 2:
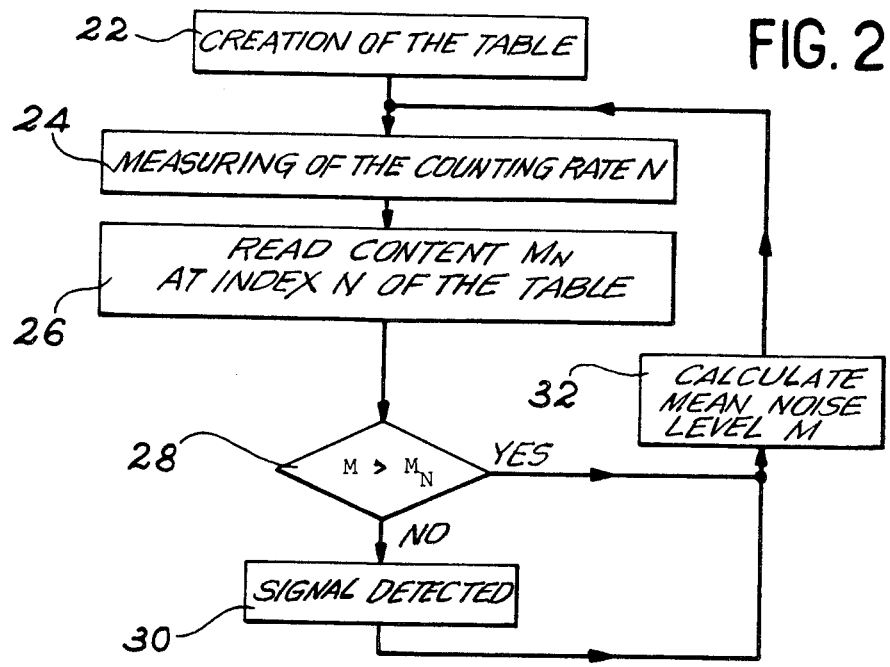
FIG. 2, in the form of a flow chart, the operation of the processing means of the detection system according to the invention, in the case of producing, for each value of the false detection rate TF, a table containing the value of the average noise level $M_N$ at index or subscript N.

FIG. 2 shows a flow chart illustrating the operation of the system according to the invention. This diagram comprises the operations represented by rectangles at an entrance and an exit and an interrogation represented by a rhombus at an entrance and two exits, one used in the case of a positive reply and the other in the case of a negative reply.

Operation 22 is the table creation operation. The table content is dependent on the chosen false detection level TF, the table being stored in memory 16. The following stage of the inventive process consists of measuring the counting rate N for a measurement period. This operation carries reference 24 in FIG. 2. This measurement merely involves counting the number of pulses supplied by the detector. The following operation 26 is the reading of the content $M_N$ of the table at subscript N.

The number $M_N$ is then compared, in interrogation stage 28, with the estimated average noise level M. If $M_N$ exceeds this known level, a decision is made to the effect that a particular radiation has been detected. In the opposite case, it is decided that the counting rate N is solely due to noise.

Operation 32 in the flow chart and which is performed between operations 28 or 30 and operation 24, relates to the evaluation of the average noise level M, which can be estimated in different ways. In a preferred manner, the average noise level is calculated as a function of at least one previously measured counting rate. For example, it can be defined as the average value of k counting rates of measurements preceding the final measurement, in which k is an integer.

This calculation leads to an estimated average noise level M, which is generally non-integral. In the same way, the numbers $M_N$ contained in the table are not generally integers. The calculations of the estimated average noise level M and the comparison between the latter and the number $M_N$ extracted from the table are consequently performed on real numbers, which increases the calculating time. Moreover, the storage of real numbers $M_N$ requires a relatively large memory.

According to a preferred variant of the invention, the interrogation stage 28 in which a comparison takes place between the estimated average noise level M and the level $M_N$ extracted from the table is replaced by the comparison of two integers. This makes it possible to simplify processing by eliminating calculations on real numbers and this makes it possible to reduce the dimensions of the table in the memory.

In the case where the estimated average noise level M is equal to the mean value of k counting rates, the comparison performed in stage 28 can relate e.g. to a number T equal to the sum of said k counting rates and to a number $T_N$ equal to the closest integer to $kM_N$, in which $M_N$ is the noise level corresponding to a predetermined false detection probability TF for a counting rate N.

Figure 3:
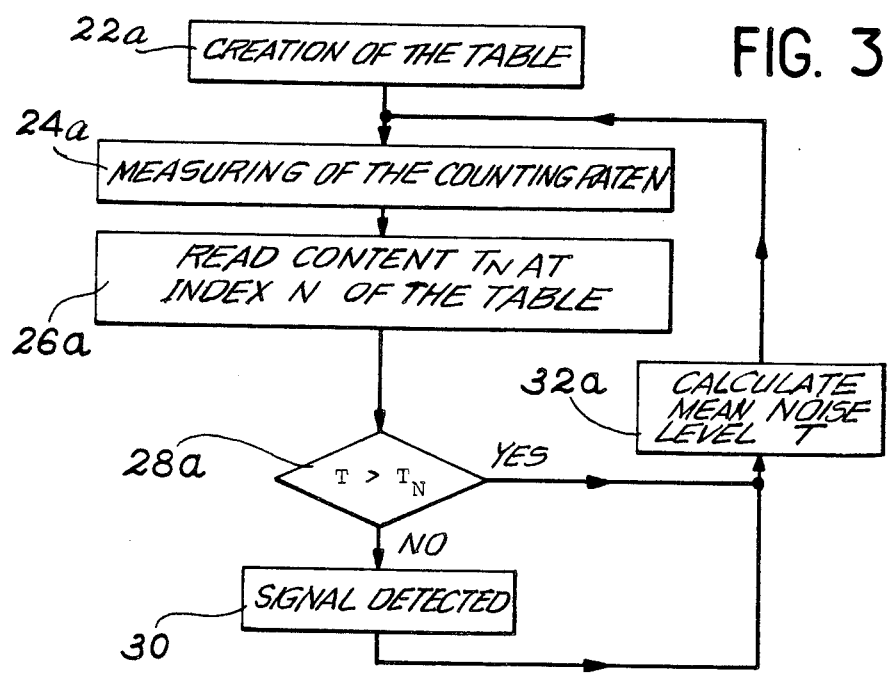
FIG. 3 a variant of the flow chart of FIG. 2 when the value contained at N in the table is an integer $T_N$, which is a function of the average noise level $M_N$.

FIG. 3 illustrates the flow chart associated with the process of the invention corresponding to the table (N, $T_N$). In this FIG. 3, the operations identical to those of FIG. 2 carry the same references. Operations 22a, 26a, 28a and 32a respectively correspond to operations 22, 26, 28 and 32 in which T and $T_N$ replace M and $M_N$.

FIG. 4 illustrates a decision table used in the system according to the invention for different values of the false detection level TF. The count rate N of the final measurement is plotted on the abscissa and the value $T_N$ equal to the closest integral value to 64M, in which M is the average noise level for which the probability of false detection PF is equal to TF if the counting rate is N, is plotted on the ordinate of the graph. This ordinate consequently defines, to within a multiplication factor, which is e.g. taken here as equal to 64, the average noise level. The detection according to the invention consists of comparing the position of the coordinate point (N, $T_N$) with the curve of the chosen predetermined false detection level $T_N$F, in which $T_N$ is equal to the sum of the 64 last counting rates preceding the final measurement. If this point is above the curve, the counting rate is due solely to the noise and in the opposite case the counting rate includes a signal due to the particular radiation.

What is claimed is:

1. A system for detecting the presence of a pure signal in a discrete noisy signal measured at a constant average noise level, comprising: in series a converter for converting radiation received thereby into electrical pulses, a shaping means, a binary counting scale, a processing means, and a signalling means; said processing means comprising a processor, at least one memory, and an input-output circuit, said processor comprising means for measuring a counting rate N during successive equal time periods, means for estimating a value of an average noise level M, means for calculating a false detection probability PF as a function of said counting rate N and of the estimated average noise level M, and means for comparing said false detection probability PF with a predetermined false detection level TF, to thereby ascertain that a pure signal has been detected when said false detection probability PF is below said false detection level.

2. A system according to to claim 1, wherein the memory comprises a sequence of cells and contains a table for one value of the predetermined false detection level TF, a cell of subscript I containing a value $M_I$, such that the false detection probability for said average noise level $M_I$ and a counting rate I is equal to the false detection level, the processor comprising means for comparing, following each measurement, a value $M_N$ contained at subscript N of the table, in which N is the measured counting rate, with the estimated average noise level M, to thereby ascertain that a pure signal has been detected when $M_N \geq M$.

3. A system according to claim 2, wherein the processor comprises means for evaluating the average noise level M for a mean value of k count rates preceding a final measurement, in which k is an integer.

4. A system according to claim 1, wherein the memory comprises a sequence of cells and contains a table for one value of the predetermined false detection level TF, a cell of subscript I containing an integral value T equal to the closest integer to $kM_I$, in which k is a given integer and $M_I$ the average noise level such that the false detection probability for said average noise level and a counting rate I is equal to the false detection level, the processor comprising means for comparing, following each measurement, a value $T_N$ contained at subscript N of the table, in which N is the measured counting rate at the integer T closest to kM, with the known average noise level, to thereby ascertain that a pure signal has been detected when $T_N \geq T$.

5. A system according to claim 4, wherein the processor comprises means for evaluating the average noise level M by the mean value of k count rates preceding a final measurement, in which k is an integer and wherein the integer T, compared with a value $T_N$ of the table, is equal to the sum of the k counting rates preceding the final counting rate N.

* * * * *